United States Patent
Yun et al.

(10) Patent No.: US 10,791,313 B2
(45) Date of Patent: Sep. 29, 2020

(54) METHOD AND APPARATUS FOR PROVIDING 6DOF OMNI-DIRECTIONAL STEREOSCOPIC IMAGE BASED ON LAYER PROJECTION

(71) Applicant: Electronics and Telecommunications Research Institute, Daejeon (KR)

(72) Inventors: Joung Il Yun, Daejeon (KR); Sang Woon Kwak, Daejeon (KR); Kug Jin Yun, Daejeon (KR); Jin Hwan Lee, Daejeon (KR); Won Sik Cheong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 16/135,275

(22) Filed: Sep. 19, 2018

(65) Prior Publication Data

US 2019/0089943 A1 Mar. 21, 2019

(30) Foreign Application Priority Data

Sep. 19, 2017 (KR) .................. 10-2017-0120242

(51) Int. Cl.
| | |
|---|---|
| *H04N 13/117* | (2018.01) |
| *G06T 7/593* | (2017.01) |
| *H04N 13/332* | (2018.01) |
| *G02B 27/01* | (2006.01) |
| *H04N 13/00* | (2018.01) |
| *H04N 19/39* | (2014.01) |
| *H04N 19/597* | (2014.01) |

(52) U.S. Cl.
CPC ......... *H04N 13/117* (2018.05); *G02B 27/017* (2013.01); *G06T 7/593* (2017.01); *H04N 13/332* (2018.05); *H04N 19/597* (2014.11); *G02B 2027/0134* (2013.01); *H04N 19/39* (2014.11); *H04N 2013/0081* (2013.01)

(58) Field of Classification Search
None
See application file for complete search history.

(56) References Cited

U.S. PATENT DOCUMENTS

| | | | |
|---|---|---|---|
| 6,993,201 B1* | 1/2006 | Haskell | H04N 19/187 375/240.08 |
| 7,848,425 B2 | 12/2010 | Cho et al. | |
| 2016/0373784 A1 | 12/2016 | Bang et al. | |
| 2018/0020204 A1* | 1/2018 | Pang | H04N 19/42 |

FOREIGN PATENT DOCUMENTS

| | | |
|---|---|---|
| KR | 10-0806201 B1 | 2/2008 |
| KR | 10-2017-0017700 A | 2/2017 |
| WO | WO 2016/038240 A1 | 3/2016 |

* cited by examiner

*Primary Examiner* — Clifford Hilaire
(74) *Attorney, Agent, or Firm* — NSIP Law

(57) ABSTRACT

Disclosed is a method and apparatus for providing an omni-directional stereoscopic image based on layer projection. According to an embodiment of the present disclosure, there is provided a method of providing an omni-directional stereoscopic image based on layer projection, the method including: obtaining a spatial-information-point set; and generating a layer image based on a spatial-information-point subset constructed for each of multiple layers, the layer image corresponding to each of the multiple layers, wherein the spatial-information-point subset constructed for each of two consecutive layers includes one or more duplicate spatial information points.

19 Claims, 12 Drawing Sheets

METHOD AND APPARATUS FOR
PROVIDING 6DOF OMNI-DIRECTIONAL
STEREOSCOPIC IMAGE BASED ON LAYER
PROJECTION

CROSS REFERENCE TO RELATED
APPLICATION

The present application claims priority to Korean Patent Application No. 10-2017-0120242, filed Sep. 19, 2017, the entire contents of which is incorporated herein for all purposes by this reference.

BACKGROUND OF THE INVENTION

Field of the Invention

The present disclosure relates generally to an omni-directional stereoscopic image. More particularly, the present disclosure relates to a method and apparatus for providing an omni-directional stereoscopic image based on layer projection.

Description of the Related Art

In omni-directional stereoscopic images, methods of supporting six degrees of freedom (6DoF) have been widely discussed. 6DoF denotes a combination of 3DoF rotation about the X-axis (pitch), the Y-axis (yaw), and the Z-axis (roll) and of 3DoF translation left-right on the X-axis, up-down on the Y-axis, and forward-backward on the Z-axis with respect to the user's viewpoint. By supporting 6DoF, the virtual reality that gives high immersiveness to the user may be provided.

Currently, most services supporting 6DoF are games or services to provide an experience of a virtual space based on objects modeled with computer graphics (CG) technology. However, a video service for representing a 6DoF omni-directional stereoscopic image based on an actual-object image is in the early stage of research around the world, and there are no the detailed plans.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method and apparatus for effectively and efficiently providing an omni-directional stereoscopic image based on an actual-object image.

Also, the present disclosure is intended to propose a method and apparatus for applying layer projection to an omni-directional stereoscopic image.

Also, the present disclosure is intended to propose a method and apparatus for preventing a hole between layers from occurring in an omni-directional stereoscopic image.

Also, the present disclosure is intended to propose a method and apparatus for reducing encoding and decoding overhead of an omni-directional stereoscopic image.

Also, the present disclosure is intended to propose a method and apparatus for reducing disharmony in image quality between layers of an omni-directional stereoscopic image.

Also, the present disclosure is intended to propose a method and apparatus for enhancing depth perception through layer projection of an omni-directional stereoscopic image.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of providing an omni-directional stereoscopic image based on layer projection, the method including: obtaining a spatial-information-point set; and generating a layer image based on a spatial-information-point subset constructed for each of multiple layers, the layer image corresponding to each of the multiple layers, wherein the spatial-information-point subset constructed for each of two consecutive layers includes one or more duplicate spatial information points.

According to another aspect of the present disclosure, there is provided a method of displaying an omni-directional stereoscopic image display based on layer projection, the method including: receiving a video segment; obtaining a layer image corresponding to each of multiple layers and metadata applied to each layer by decoding layer-image-video segments included in the video segment; and performing layer projection on the layer image corresponding to each of the multiple layers for a view image of a left viewpoint and a view image of a right viewpoint based on viewpoints determined depending on one or more of translation and rotation of a user, wherein in the layer image corresponding to each of the multiple layers, a subset of valid pixels corresponding to spatial information points constructed for each of two consecutive layers includes a valid pixel corresponding to at least one duplicate spatial information point.

According to another aspect of the present disclosure, there is provided an apparatus for providing an omni-directional stereoscopic image based on layer projection, the apparatus including: a spatial information point layer-projection unit constructing a spatial-information-point subset for each of multiple layers from a spatial-information-point set that is obtained; and a layer image converting unit generating a layer image based on the spatial-information-point subset constructed for each of the multiple layers, the layer image corresponding to each of the multiple layers, wherein the spatial-information-point subset constructed for each of two consecutive layers includes one or more duplicate spatial information points.

According to another aspect of the present disclosure, there is provided an apparatus for displaying an omni-directional stereoscopic image based on layer projection, the apparatus including: a video segment streaming client receiving a video segment; a layer-image-video-segment decoding unit obtaining a layer image corresponding to each of multiple layers and metadata applied to each layer by decoding layer-image-video segments included in the video segment; and a layer image layer-projection unit performing layer projection on the layer image corresponding to each of the multiple layers for a view image of a left viewpoint and a view image of a right viewpoint based on viewpoints determined depending on one or more of translation and rotation of a user, wherein in the layer image corresponding to each of the multiple layers, a subset of valid pixels corresponding to spatial information points constructed for each of two consecutive layers includes a valid pixel corresponding to at least one duplicate spatial information point.

In at least one of the various aspects of the present disclosure, among the multiple layers, a spatial-information-point subset $P_j$ constructed for a j-th layer may include spatial information points that satisfy $$P_j=\{p_k\in P|r_{j,min}(\theta_k,\varphi_k)<\rho_k\leq r_{j,max}(\theta_k,\varphi_k)\},$$

$\rho_k$ may denote a distance from a projection center to a spatial information point $p_k$, $\theta_k$ may denote latitude of the spatial information point $p_k$ from the projection center, $\varphi_k$ may denote longitude of the spatial information point $p_k$ from the projection center, $r_{j,min}(\theta_k, \varphi_k)$ may denote a minimum value in a range of the spatial information points constructed for the j-th layer, and $r_{j,max}(\theta_k, \varphi_k)$ may denote a maximum value in the range of the spatial information points constructed for the j-th layer.

In at least one of the various aspects of the present disclosure, the maximum value in the range of the spatial information points constructed for the j-th layer and a minimum value in a range of spatial information points constructed for a j+1-th layer may be set to satisfy $r_{j,max}(\theta_k, \varphi_k) > r_{j+1,min}(\theta_k, \varphi_k)$.

In at least one of the various aspects of the present disclosure, at least one of the multiple layers may be a higher layer constructed by merging multiple base layers.

In at least one of the various aspects of the present disclosure, gaps between the multiple layers may be set depending on distances from a projection center.

In at least one of the various aspects of the present disclosure, the gap between layers close to the projection center may be set to be narrower than the gap between layers far from the projection center.

In at least one of the various aspects of the present disclosure, a maximum value of a number of the multiple layers and a size of a projection object corresponding to each of the multiple layers may vary with time.

In at least one of the various aspects of the present disclosure, a first valid pixel of a layer image of a first layer may replace a second valid pixel among valid pixels of a layer image of a second layer that is farther from a projection center than the first layer, the second valid pixel being mapped to same pixel coordinates as the first valid pixel.

In at least one of the various aspects of the present disclosure, be replaced by a valid pixel among the valid pixels of the layer image of the second layer, the valid pixel being mapped to same pixel coordinates as the transparent pixel.

In at least one of the various aspects of the present disclosure, resolution of the layer image for each layer may be set in such a manner that an area of a surface of a projection object is fixed in size regardless of the layer.

In at least one of the various aspects of the present disclosure, the method of providing the omni-directional stereoscopic image may further include generating multiple pieces of layer-image-video-segment data based on the layer image corresponding to each of the multiple layers.

In at least one of the various aspects of the present disclosure, each of the multiple pieces of layer-image-video-segment data may be generated based on a profile for each layer and metadata.

In at least one of the various aspects of the present disclosure, the metadata may include at least one selected from a group of layer-projection structure information depending on a video segment profile, a total number of projection objects required in configuring layer projection, a serial number of each projection object mapped to each layer image, and structure information of each projection object.

In at least one of the various aspects of the present disclosure, the method of providing the omni-directional stereoscopic image may further include generating and transmitting a video segment based on a combination of the multiple pieces of layer-image-video-segment data.

In at least one of the various aspects of the present disclosure, the apparatus for providing the omni-directional stereoscopic image may further include a projection merging unit merging multiple base layers to construct a higher layer which is at least one of the multiple layers.

In at least one of the various aspects of the present disclosure, the apparatus for providing the omni-directional stereoscopic image may further include a layer-image-video-segment encoding unit generating multiple pieces of layer-image-video-segment data based on the layer image corresponding to each of the multiple layers.

In at least one of the various aspects of the present disclosure, the apparatus for providing the omni-directional stereoscopic image may further include a video segment streaming server generating and transmitting a video segment based on a combination of the multiple pieces of layer-image-video-segment data.

It is to be understood that the foregoing summarized features are exemplary aspects of the following detailed description of the present disclosure without limiting the scope of the present disclosure.

According to the present disclosure, the method and apparatus for effectively and efficiently providing the omni-directional stereoscopic image based on the actual-object image may be provided.

According to the present disclosure, the method and apparatus for applying layer projection to the omni-directional stereoscopic image may be provided.

According to the present disclosure, the method and apparatus for preventing the hole between layers from occurring in the omni-directional stereoscopic image may be provided.

According to the present disclosure, the method and apparatus for reducing encoding and decoding overhead of the omni-directional stereoscopic image may be provided.

According to the present disclosure, the method and apparatus for reducing disharmony in image quality between layers of the omni-directional stereoscopic image may be provided.

According to the present disclosure, the method and apparatus for enhancing depth perception through layer projection of the omni-directional stereoscopic image may be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
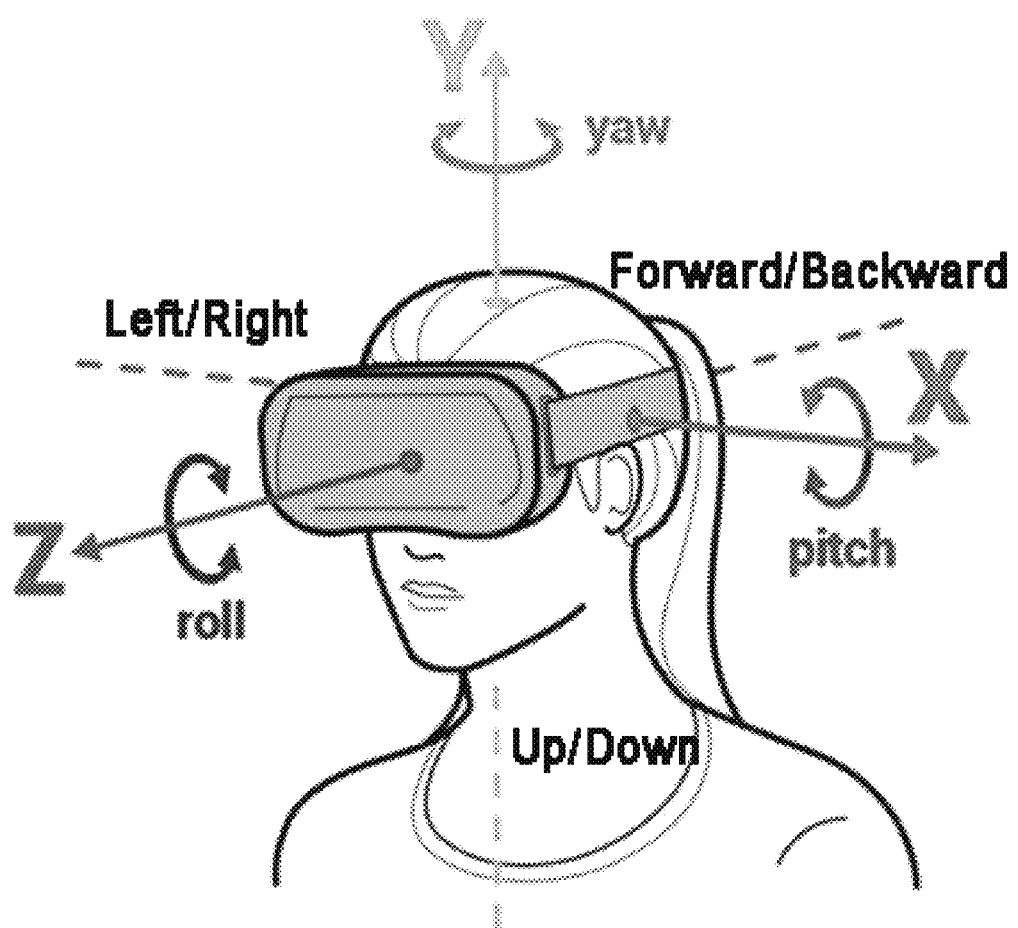
FIG. 1 is a diagram illustrating 6DoF movement of a user, to which the present disclosure may apply.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

In the present disclosure, the term image may mean one picture or frame constituting a moving picture or a video, or may mean the moving picture itself. For example, "image encoding and/or decoding" may mean "video encoding and/or decoding", or may mean "encoding and/or decoding one of images composing a video". Here, the picture and the image may have the same meaning.

Hereinafter, a method and apparatus for providing a 6DoF omni-directional stereoscopic image based on a layer-projection structure will be described. In the present disclosure, the method and apparatus for providing the image may include a method and apparatus for generating or encoding an image, for transmitting an image signal, receiving the image signal, and representing or decoding the image. Also, in the present disclosure, the term omni-directional stereoscopic image may be referred to as a 360-degree stereoscopic image.

More specifically, in the present disclosure, by expanding the method of providing the image through projection based on a video image, a 6DoF omni-directional stereoscopic image is provided within a predetermined range according to the rotation and translation of the user view on the basis of a layered projection structure using multiple video images, whereby 360-degree stereoscopic virtual reality (VR) service is enhanced in immersiveness.

FIG. 1 is a diagram illustrating 6DoF movement of a user, to which the present disclosure may apply.

FIG. 1 shows an example where a user wears a head-mounted display (HMD) and an omni-directional stereoscopic image is represented according to the 6DoF movement of the user. However, the scope of the present disclosure is not limited thereto, the embodiments of the present disclosure are applicable to the case where the omni-directional stereoscopic image is represented via other display means such as a hologram, a 360-degree screen, or the like other than the HMD.

FIG. 1 shows 6DoF movement that is a combination of 3DoF rotation about the X-axis (pitch), the Y-axis (yaw), and the Z-axis (roll) and of 3DoF translation left/right on the X-axis, up/down on the Y-axis, and forward/backward on the Z-axis with respect to the head-mounted display (HMD) user. By supporting 6DoF, virtual reality service that gives high immersiveness to the user may be provided.

Currently, most services supporting 6DoF are games or services to provide an experience of a virtual space based on objects modeled with computer graphics (CG) technology. However, a video service for representing a 6DoF omni-directional stereoscopic image based on an actual-object image is in the early stage of research around the world, and securement of core technology is urgently needed.

Among VR services based on an actual-object image, in the 360-degree stereoscopic VR service, in order to construct two images (left and right) that provide binocular parallax from multiple images during camera shooting and image processing, sampling may be partially performed on each image according to the camera arrangement structure. A geometrical image transformation technique, such as image warping, and the like, is performed and a stitching process for combining scenes of the image together is performed, such that sampled and segmented images may be combined.

Figure 2A:
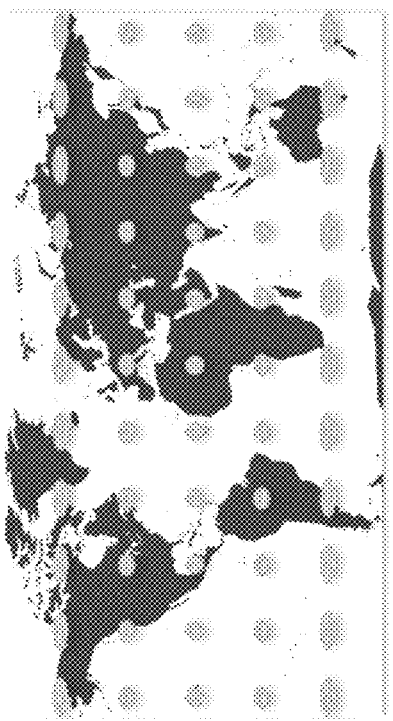
FIGS. 2A and 2B are diagrams illustrating examples of a projection image format to which the present disclosure may apply.
Figure 2A:
Figure 2A:
Figure 2B:
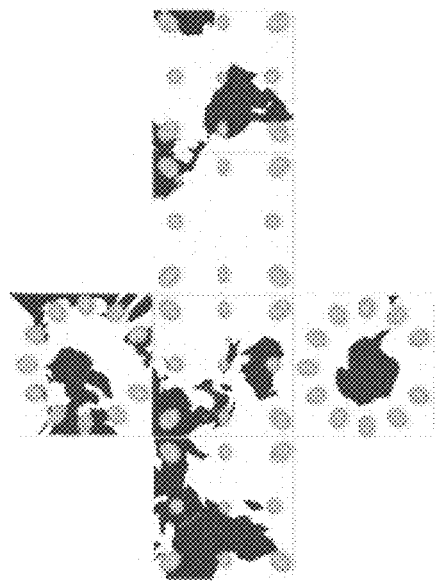
Figure 2B:
Figure 2B:
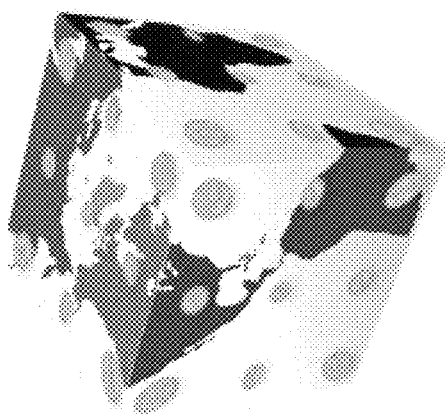

FIGS. 2A and 2B are diagrams illustrating examples of a projection image format to which the present disclosure may apply.

In order to represent the video image with an illusion of space, it is necessary to specify a projection image format. For example, as shown in the example in FIG. 2A, according to the projection type in the spherical shape, conversion into an equirectangular projection image is possible. Alternatively, as shown in the example in FIG. 2B, according to the projection type in the cube shape, conversion into a cube map projection image is possible.

The examples in FIGS. 2A and 2B show projection image formats in the equirectangular and the cube-map shapes. However, the scope of the present disclosure is not limited thereto, the embodiments of the present disclosure are applicable to the case using a variety of different projection image formats.

Figure 3:
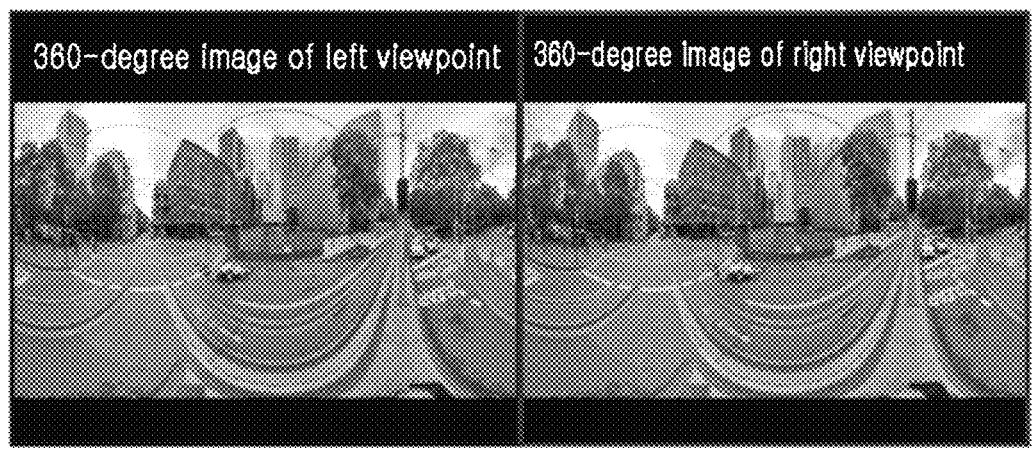
FIG. 3 is a diagram illustrating an example of a configuration of a 360-degree stereoscopic VR video to which the present disclosure may apply.
Figure 3:
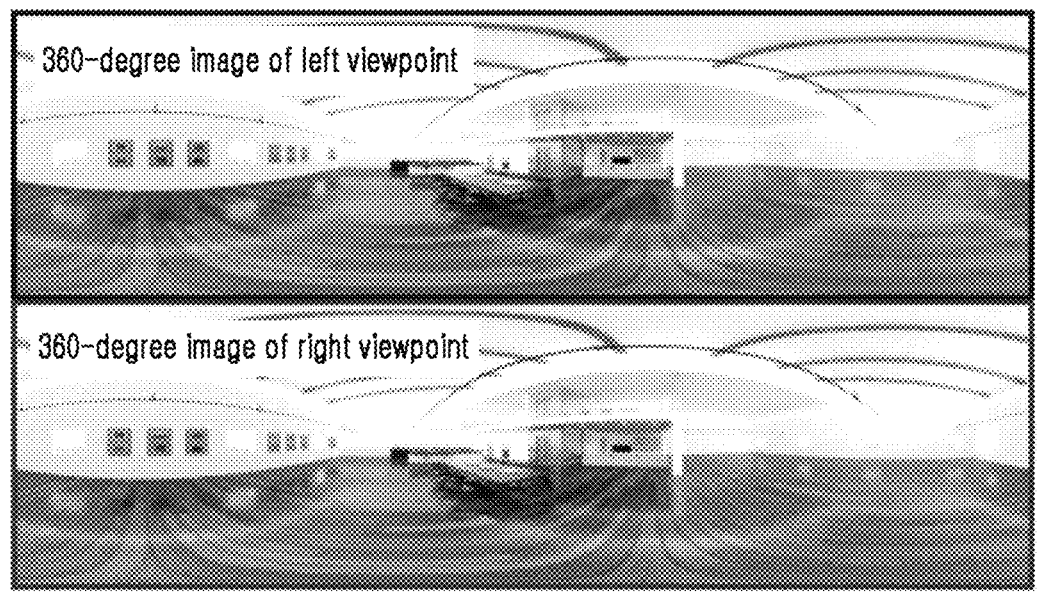

FIG. 3 is a diagram illustrating an example of a configuration of a 360-degree stereoscopic VR video to which the present disclosure may apply.

Figure 4:
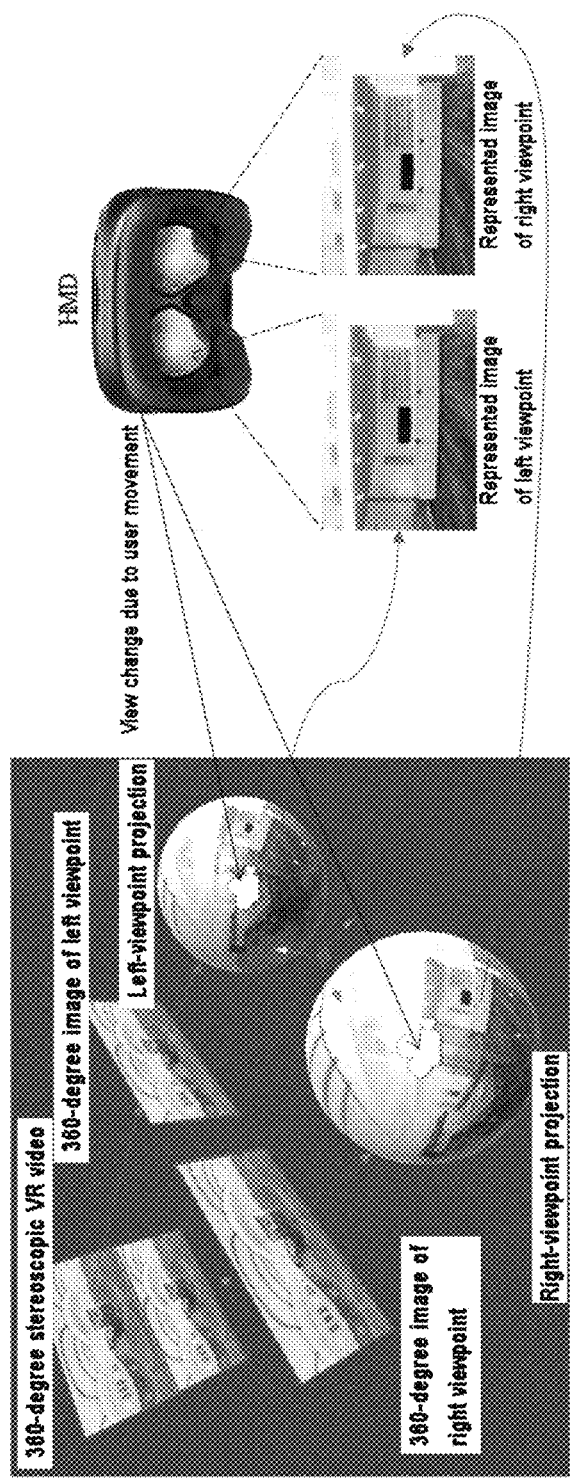
FIG. 4 is a diagram illustrating an example of a method of representing a 360-degree stereoscopic VR video to which the present disclosure may apply.

FIG. 4 is a diagram illustrating an example of a method of representing a 360-degree stereoscopic VR video to which the present disclosure may apply.

FIG. 3 shows an example of generating a 360-degree stereoscopic VR video by constructing images processed to provide binocular parallax based on each left/right viewpoint of the user.

The process of displaying the 360-degree stereoscopic VR video may include; separating the left and right-viewpoints image of the video shown in FIG. 3; and constructing the image in the geometrical shape shown in FIG. 4 according to the projection image format for display. Accordingly, images of the left and right-view regions are output on respective left and right screens of a display (for example, the HMD), and a 360-degree stereoscopic image with an illusion of space in which the user can look around according to the head rotation of the HMD user is provided.

In the present disclosure, a virtual projection object (for example, the spherical shape) in a structure corresponding to the projection image format is placed in the virtual space, and a video image may be displayed as the texture projected on the inner surface of the object. Also, in the present disclosure, an example in which view regions at the left and right viewpoints of the user are viewed from the center in the projection object is described. However, the method of representing the image may be the same as the method of representing a view image generated by direct conversion from the 360-degree video image through a geometrical operation according to the image coordinate position corresponding to the view that the user faces.

In the present disclosure, for ease of understanding, the method of representing the image with an illusion of space according to the projection image format in the three-dimensional space will be described in a manner that a projection object constructed in the virtual space is used for display. However, the scope of the present disclosure is not limited thereto, and the various embodiments of the present disclosure may apply to a method of using a projection object in various shapes other than a sphere or a method of directly representing an image rather than being projected on the projection object.

According to a conventional method of providing a 360-degree stereoscopic image, in the process of obtaining the image and constructing the left and right-viewpoints image, an image is generated that is projected to provide left and right parallax that occurs when viewing in the direction of yaw rotation about the Y-axis in a fixed state without roll rotation about the Z-axis. Therefore, provided is only binocular parallax caused by yaw rotation and binocular parallax of some sections caused by pitch rotation about the X-axis within a limited range. For example, according to the conventional method, when raising the user's viewpoint to the ceiling or lowering to the floor, binocular parallax gradually decreases and the parallax disappears at the fixed point of the ceiling or the floor (that is, providing binocular parallax related to pitch rotation may be difficult).

Also, according to the conventional method, the image is represented in a manner that the region corresponding to the user's viewpoint among the images displayed on the inner surface of the projection object is viewed. Therefore, even though the image on the inner surface of the projection object, to which the same geometric structure as the actual scene of the image is not applied, is viewed by changing the view region according to the user's translation, motion parallax, or binocular parallax in all directions that occur due to the depth difference in the actual space are unable to be provided.

Also, according to the conventional method, in a single video image, the left and right-viewpoints image is represented in a separated manner. Therefore, compared with the whole video resolution, the image quality that the user perceives is relatively low. In order to provide the image quality at a particular resolution level, it may be required that encoding to the video image with two or more times higher resolution is performed considering the sizes of the two images of the left and right viewpoints.

In the present disclosure, rather than the VR service providing 6DoF by rendering a virtual space composed of objects modeled by a computer such as game or CG, a method of providing, for the VR service, an actual-object image obtained by photographing an actual space using an omni-directional stereoscopic camera according to the 6DoF movement (namely, three-dimensional translation and rotation) of the user will be described.

According to the present disclosure, a 360-degree stereoscopic image, in which motion parallax and binocular parallax are provided within a predetermined range of 6DoF in a particular space, similar to that viewed in actual space may be provided. That is, according to the conventional technology, the space direction (for example, the fixed point of the ceiling or the floor) in which binocular parallax and motion parallax are not correctly provided may present. However, according to the examples of the present disclosure, binocular parallax and motion parallax are provided within a range of a particular view direction or a particular movement direction without limitation of the 360-degree space direction. However, in the present disclosure, the predetermined range in which motion parallax and binocular parallax are provided means a limited range compared with complete free space, and may mean, for example, the range within the projection object.

In describing the various embodiments of the present disclosure, there is no limit to a camera structure or a sensor that obtains images and depth information in the three-dimensional space for providing the 6DoF service. That is, in the various embodiments of the present disclosure, it is assumed that a three-dimensional space image and depth information data have been obtained using spatial information acquisition techniques, which use a camera and a sensor in an arbitrary structure, or using an arbitrary nonlinear cinematography. Also, it is assumed that the data contains sufficient quantitative and qualitative information required in providing motion parallax and binocular parallax caused by translation and rotation of the user within a given range. When the three-dimensional space images and depth information data are not sufficiently obtained, a parallax change image caused by translation and rotation of the user is not completely represented, and thus a hole or crack phenomenon may occur in the image.

Also, in the present disclosure, it is assumed that the three-dimensional space image and the depth information data are similar to point cloud data expressed by three-dimensional coordinate values of one point in space and the color, the brightness, and the like of which the image represents the point. However, the various embodiments of the present disclosure are not only applicable to input of the point cloud data form, but also applicable to most data forms expressing the three-dimensional space image and the depth information or applicable through conversion required for an arbitrary data form (for example, conversion of arbitrary data on one point in the three-dimensional space into an RGB value and a depth map form). Hereinafter, for clarity of description of the embodiments of the present disclosure, three-dimensional space image and depth information data in arbitrary forms are referred to as the term "a spatial information point", and the data expression form thereof is not limited.

Figure 5:
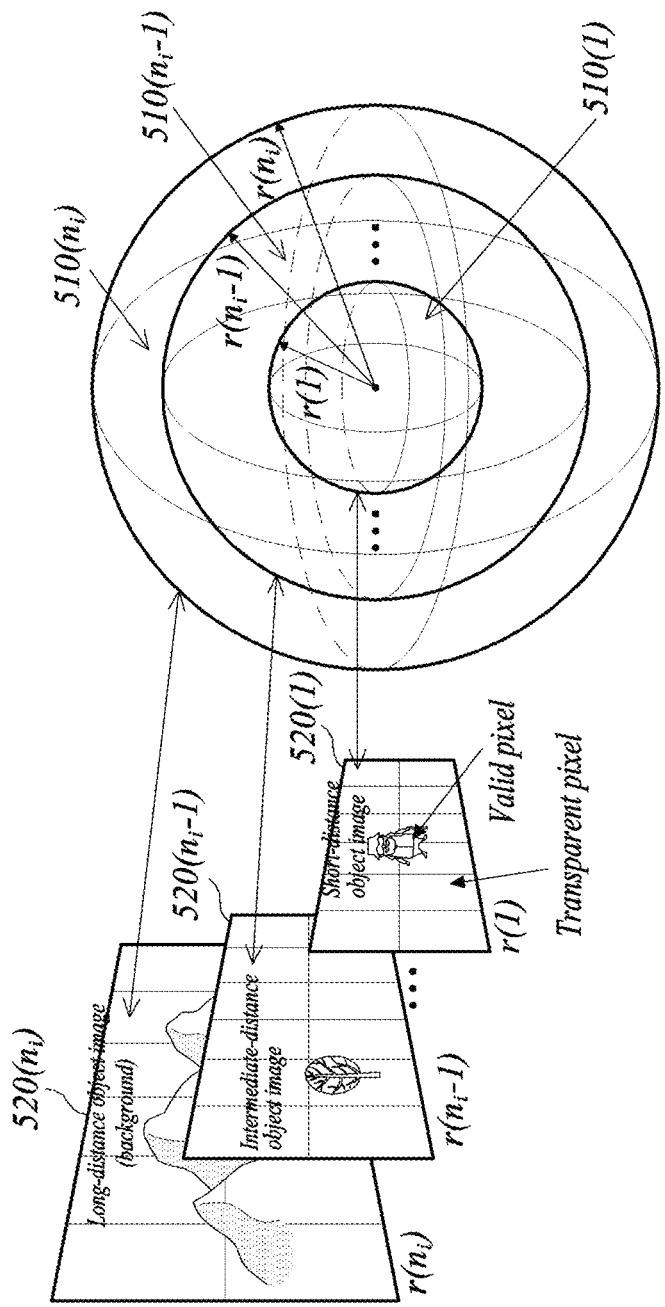
FIG. 5 is a diagram illustrating an image layer-projection structure according to the present disclosure.

FIG. 5 is a diagram illustrating an image layer-projection structure according to the present disclosure.

Prior to describing the example in FIG. 5, in the present disclosure, one projection object corresponds to one base layer. That is, the projection object and the base layer have a one-to-one corresponding relation. When multiple projection objects are configured, the multiple projection objects correspond to different base layers, respectively. Also, one base layer has one base-layer image. Thus, multiple projection objects correspond to different base-layer images, respectively.

The example in FIG. 5 shows a relation between multiple projection objects $510(n_x)$ and multiple base-layer images $520(n_x)$ corresponding thereto (here, $n_x=1, 2, \ldots n_i-1$, and $n_i$). Specifically, each of $n_i$ projection objects $510(1)$, $510(2), \ldots, 510(n_i-1)$, and $510(n_i)$ corresponds to one base layer in a one-to-one manner, and $n_i$ base-layer images $520(1), 520(2), \ldots, 520(n_i-1)$, and $520(n_i)$ are configured.

Here, i denotes a temporal serial number of the scene. That is, up to $n_i$ projection objects may be configured with respect to one i-th scene, and the projection object corresponds to the base-layer image in a one-to-one manner, such that up to $n_i$ layer images may be constructed.

Accordingly, one i-th scene may be expressed by a mix or a combination of multiple (namely, $n_i$) base-layer images. That is, one i-th scene may be constructed by a combination of the first layer image $520(1), \ldots$, the $n_i-1$-th layer image $520(n_i-1)$, and the $n_i$-th layer image $520(n_i)$. Each layer image may include transparent pixels and valid pixels. The transparent pixel means a pixel in which a pixel of the relevant layer is not viewed and an image of the subsequent layer (namely, a layer having a larger value of $n_x$) is viewed in a transmitted manner. The valid pixel means a pixel in which an image of the subsequent layer (namely, a layer having a larger value of $n_x$) is hidden and a pixel of the relevant layer is viewed. All pixels of a single layer image may be valid pixels, or all pixels of a single layer image may be transparent pixels.

Also, in FIG. 5, $r(n_x)$ (here, $n_x=1, 2, \ldots n_i-1$, and $n_i$) denotes metadata indicating the size of each projection object. Specifically, FIG. 5 shows an example in which the projection object is a projection sphere. The size of the first projection object $510(1)$ may be expressed by the radius $r(n_1)$ of the projection sphere, the size of the $n_i-1$-th projection object $510(n_i-1)$ may be expressed by the radius $r(n_i-1)$ of the projection sphere, and the size of the $n_i$-th projection object $510(n_i)$ may be expressed by the radius $r(n_i)$ of the projection sphere.

With reference to FIG. 5, a method of representing a 6DoF omni-directional stereoscopic image within a predetermined range using multiple layer images according to the present disclosure will be described. In the example shown in FIG. 5, assuming an equirectangular projection image using a projection object in the spherical shape, a method of expanding to a multiple-layer structure will be described. However, the scope of the present disclosure is not limited thereto, the following examples are equally applicable to the case in which various projection image formats are used, such as a projection image in the cube-map shape using a projection object in the cube shape, and the like.

In the example shown in FIG. 5, the layer image may be constructed by mapping spatial information points, which indicate the color and brightness in the three-dimensional position of the actual scene, to pixels of images through a conversion process according to the projection image format. To this end, a process of searching for points positioned in a predetermined range from the projection central point by dividing the points according to the layer and of converting the points into pixels of images according to the projection object shape of the relevant layer may be performed.

Here, the pixel of the spatial information point projected by being converted into an image pixel coordinate system may be referred to as the valid pixel. Also, a pixel which is not projected, namely, a pixel of a portion having no spatial information of the object positioned in the relevant range may be referred to as the transparent pixel. The transparent pixel is a pixel filled with the color selected as a transparent color, and corresponds to a portion on which the image of the back layer is projected when the layer image is mapped onto the surface of the projection object and is viewed from the inside.

Also, the pixels that make up an image of a single base layer corresponding to a single projection object may correspond to a set of spatial information points adjacent to the spatial position (or the distance or the depth) on the surface of the relevant projection object. That is, spatial information points relevant to the surface of the projection object as well as spatial information points positioned in a space closer to or farther from the projection center may be expressed by pixels of the base-layer image corresponding to the relevant projection object.

Figure 6:
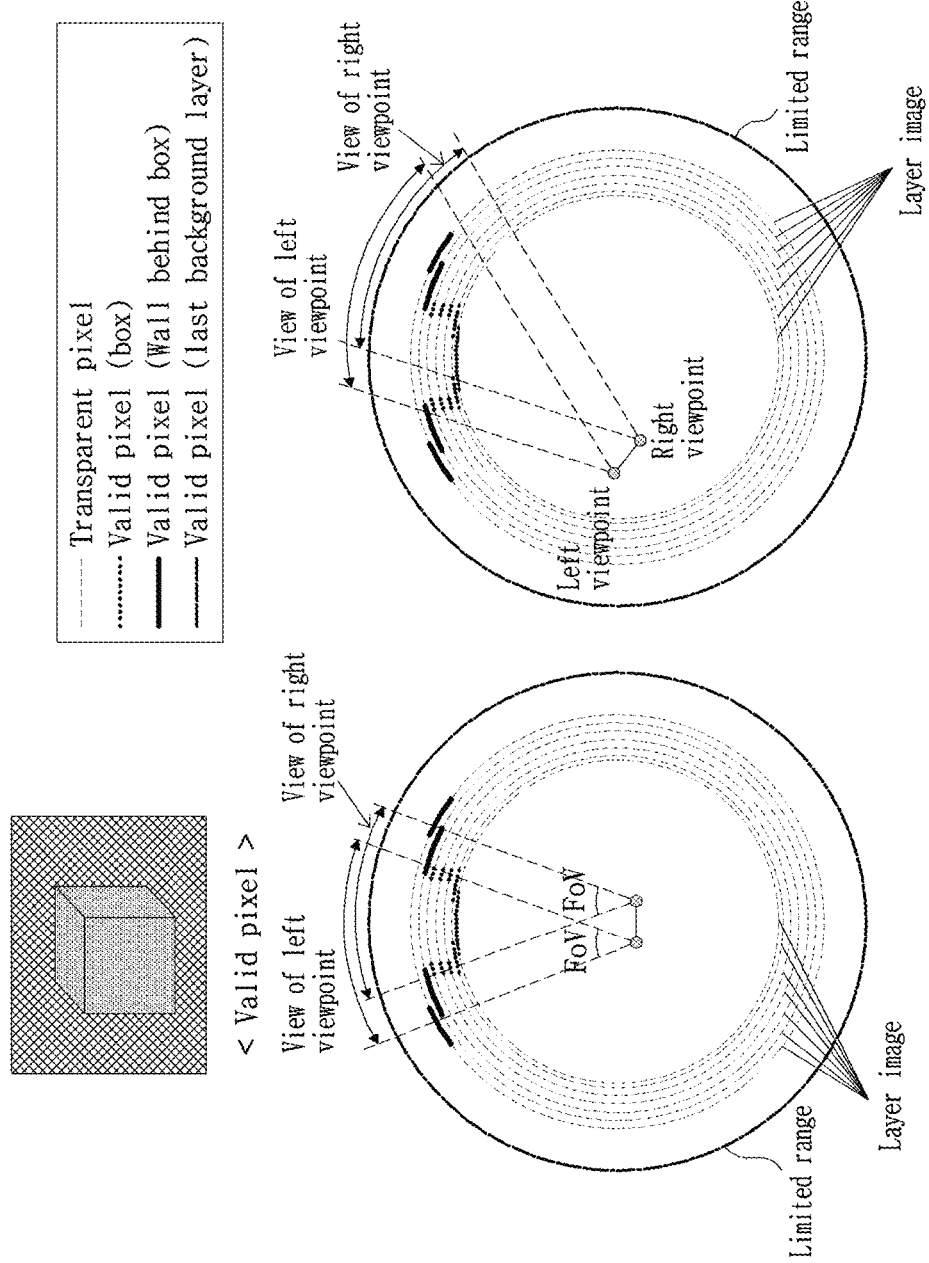
FIG. 6 is a diagram illustrating an example of representing views of binocular viewpoints by layer projection according to the present disclosure.

FIG. 6 is a diagram illustrating an example of representing views of binocular viewpoints by layer projection according to the present disclosure.

In representing multiple layer images using layer projection, FIG. 6 shows an example of image representation in which left and right binocular parallax and motion parallax due to limited 6DoF movement (for example, translation and rotation within a predetermined range limited by the range of the projection object) are provided.

FIG. 6A shows an example of an X-Z axes cross section of the views of the left and right viewpoints from the layer projection center, and FIG. 6B shows an example of an X-Z axes cross section in which the views of the left and right viewpoints are changed by translation and rotation. The examples shown in FIGS. 6A and 6B show the X-Z axes cross section for convenience of description, but the same example may apply in the entire 360-degree direction.

Referring to FIG. 6A, each of multiple layer images corresponding to multiple layers is mapped onto the surface of the projection object corresponding to the relevant layer for display, and the view image of each of the left and right viewpoints is viewed from the inside of the projection object. At the transparent pixel portions of the image mapped to the inside of the projection object, the image of the back layer is viewed in a transmitted manner. The valid pixel portions are viewed in a superimposed manner depending on the distance in the layer structure. The valid pixels of the front most layer (namely, the layer closest to the projection center) are viewed within the field of view (FoV) of the viewpoint, and thus a volumetric image that consists of a combination of the valid pixel portions and the transparent pixel portions, which are superimposed by the three-dimensional structure of the scene according to the change of the user's viewpoint, is represented.

In the examples of the present disclosure, within the predetermined range (for example, the range limited by the range of the projection object) according to translation and rotation of the user, in order to be sufficient to provide the image in which binocular parallax and motion parallax occur, it is assumed that data corresponding to spatial information points at various angles and directions is obtained.

In the example shown in FIG. 6, when data of the spatial information points corresponding to the side of the box, which is an example of an actual three-dimensional space figure, is not obtained, the valid pixels are not projected on the layer corresponding to the side portion of the box, and the image of the side portion of the box is not filled in the left and right view images according to translation and rotation of the user, and thus the hole occurs.

Also, even though the data of the spatial information points is sufficiently obtained, the hole may occur when the number of layers is not large enough to apply the obtained spatial information as accurately as possible. For example, when the distance between layers is set to be not fine, the hole occurs according translation and rotation of the user.

Also, when spatial information points with large distance from the surface of the projection object are projected onto a single layer, there is a great likelihood that spatial information points far from the surface of the projection object are represented by an image with larger distortion than the actual data. This phenomenon is similar to a relation that in the process of quantizing an analog signal to a digital signal, when the quantization level, the sampling rate, or density (granularity) is high, the quality of the signal is good, but the amount of data is large, whereas when it is low, the quality of the signal is low, but the amount of data is small.

According to the present disclosure, the gap between layers may be set on the basis of the distance from the projection center. Therefore, the gaps between consecutive layers may be equal to each other or different from each other. More specifically, the gap between a first layer and a second layer may be equal to or different from the gap between the second layer and a third layer.

For example, when being close to the center of the projection object, the gap between layers is set to be small (or fine), and when being far from the center of the projection object, the gap between layers is set to large (or coarse), whereby distortion is reduced. This is considered that when being close to the position of the user (or the center of the projection object), the change caused by translation or rotation of the user is large, and when being far from the position of the user (or the center of the projection object), the change caused by translation or rotation of the user is small.

More specifically, in the scene in which there are many spatial information points positioned relatively close to the projection center, the number of projection layers is large, and the gap between layers is set in proportion to the distance from the projection center to the surface of the projection object. That is, the number and size of projection objects may be set in such a manner that when being close to the center of the projection object, the gap between layers is fine.

Also, according to the present disclosure, the number and sizes of projection objects may be set depending on scene change (namely, time flow of the video). In the example shown in FIG. 5, i denotes the temporal serial number (or a frame index) of the scene in which spatial information points have the similar distance characteristic, $n_i$ denotes the maximum value of the number of projection objects (or the number of base layers, or the number of base-layer images) in the current i-th scene, and the size of each projection object may be set to $r(n_x)$ (here, $n_x=1, 2, \ldots n_i-1$, and $n_i$). Here, according to the present disclosure, in order to represent the spatial information points, which vary depending on the scene, as effectively as possible through the layer-projection method, the maximum value (namely, $n_i$) of the number of projection objects (or the number of layers, or the number of layer images) and the size r ($n_x$) (here, $n_x=1, 2, \ldots, n_i-1$, and $n_i$) of each projection object may vary depending on time flow (namely, the change in the value of i).

Figure 7:
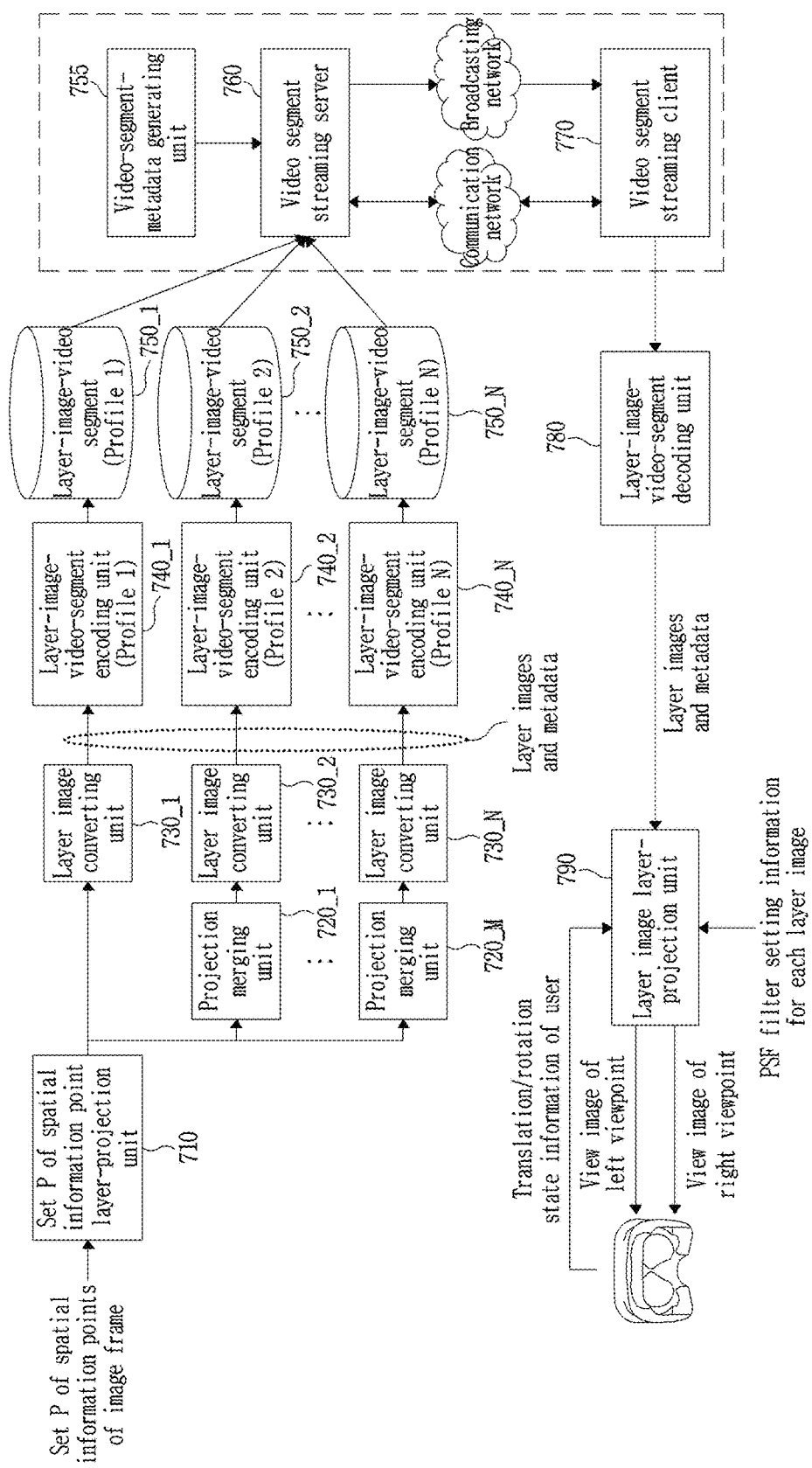
FIG. 7 is a diagram illustrating a system structure for layer projection according to the present disclosure.

FIG. 7 is a diagram illustrating a system structure for layer projection according to the present disclosure.

The system shown in FIG. 7 may provide a 6DoF omnidirectional stereoscopic image service based on a layer-projection structure for multiple images.

In the example shown in FIG. 7, input to the whole system may be expressed by a set P of spatial information points that make up a single video image frame (namely, the image corresponding to the i-th viewpoint) in the i-th scene. The final outputs of the whole system are view images of the left and right viewpoints displayed or represented on a user display (for example, the HMD).

According to the system shown in FIG. 7, for each of multiple layers for projecting a set of spatial information points of a single i-th image frame, the layer image is configured and encoded according to the profile having a predetermined quality, multiple layer-image-video segments may be generated as the result. A combination or set of multiple layer-image-video segments may make up a video segment. An encoded video segment may be transmitted to a client side (namely, a user) over a broadcasting network and a communication network (or a broadcasting-communication convergence network). Here, the video segment which transmitted over the network is a video segment adaptively configured according to the statue of a segment network or according to a predetermined profile based on user selection or preference. Multiple video segments which are adaptively configured may be transmitted to the client side continuously (namely, in a streaming method) over time.

As the streaming method, for example, a video streaming method based on Dynamic Adaptive Streaming over HTTP (DASH) may apply. Also, transmission and reception techniques for image encoding or decoding, and adaptive streaming of video segments are not particularly limited. However, in the process of encoding or decoding the video segments, metadata required in receiving multiple layer images and representing them in the layer-projection structure may also be encoded or decoded.

Examples of metadata for layer projection are as follows.
Projection structure information depending on a video segment profile
The total number of projection objects required in configuring layer projection
The serial number of each projection object mapped to each layer image
Structure information of each projection object (for example, the relative or absolute size, and geometrical structure information (for example, a sphere, a cube, or the like))

The metadata in the present disclosure is not limited to the above-described examples, and may be composed of any one or a combination of the above-described examples, or may further include additional information.

Also, in the examples of the present disclosure, there is no particular limitation on a field data structure for metadata transmission, a data transmission position within a segment file, or the like. Necessary information required in representing each layer image in the projection structure of the relevant layer depending on the profile may be included.

The above-described metadata may be referred to as metadata of a layer image. Metadata required for layer configuration may be transmitted with image data to layer-image-video-segment encoding units 740_1, 740_2, ..., and 740_N and to a video-segment-metadata generating unit 755 in stages.

The range of spatial information points mapped to a single base layer may be determined as follows.

In the example shown in FIG. 7, a spatial information point layer-projection unit 710 receives a total set $P=\{p_1, p_2, \ldots, p_K\}$ of spatial information points of the i-th frame scene of the video image, and calculates the distance from the projection central point to each of the spatial information points.

The spatial information point layer-projection unit 710 searches for a subset of spatial information points positioned at the distance in a predetermined range selected depending on the size of the projection object (for example, a radius of the sphere when the projection object has a spherical shape), and performs indexing on data of the spatial information points included in the subset. For example, indexing may include arrangement in order of decreasing distance based on the distance from the projection center and numbering. That is, the points are arranged in order of decreasing distance to the projection central point (or a high index value is assigned). The indexing is merely illustrative and is not limited thereto, and indices may be assigned in order of increasing distance from the projection central point. Alternatively, the lowest index may be assigned to a particular position from the projection central point, and indices are assigned in order of increasing distance from the particular position. In the following description for clarity, it is assumed that a relatively low index is assigned to a spatial information point relatively far from the projection center.

In the present disclosure, in mapping which spatial information point to which base layer, with respect to a single base layer set at a spatial position spaced apart from the projection central point by $r(n_x)$, the spatial information points included in the range of $r_{min}(n_x) < r(n_x) \leq r_{max}(n_x)$ may be set to be mapped to the single base layer. Here, the difference value between $r_{min}(n_x)$ and $r_{max}(n_x)$ may be set for each layer differently or equally. Accordingly, the spatial information points spread within a close distance may be included in projection of the same single layer.

Also, according to the present disclosure, in a spatial-information-point subset (also referred to as the subset of spatial information points) configured for each of two consecutive base layers, at least one duplicate spatial information point may be set to be included. Accordingly, occurrence of the hole caused by translation or rotation of the user may be prevented.

Here, two consecutive base layers are two base layers having consecutive index values when assigning an index of the base layer in order of decreasing distance (or in order of increasing distance) from the projection central point.

That is, the spatial information point layer-projection unit 710 may set the subset $P_j$ of spatial information points included in the j-th base layer and the subset $P_{j+1}$ of spatial information points included in the j+1-th base layer to satisfy the following Equation.

$$P_j \cap P_{j+1} \neq \emptyset \qquad \text{[Equation 1]}$$

Also, the maximum value and the minimum value of the distance (namely, the distance from the projection central point) that determines the subset of the spatial information points included in each base layer may be set constantly. However, generally, the subset of the spatial information points included in the j-th base layer may be expressed as shown in the following Equation 2.

$$P_j = \{p_k \in P \mid r_{j,min}(\theta_k, \varphi_k) < \rho_k \leq r_{j,max}(\theta_k, \varphi_k)\} \qquad \text{[Equation 2]}$$

In Equation 2, $\rho_k$, $\theta_k$, and $\varphi_k$ denote the distance, the latitude, and the longitude of the spatial information point $p_k$ based on the projection center, respectively. Also, $r_{j,min}(\theta_k, \varphi_k)$ and $r_{j,max}(\theta_k, \varphi_k)$ are the minimum value and the maximum value in the range of the spatial information points included in the j-th base layer, and are determined depending on the latitude and the longitude.

Here, in order to satisfy Equation 1 (namely, in order that at least one duplicate spatial information point is present in two consecutive base layers), the relation as shown in the following Equation 3 may be set.

$$r_{j,max}(\theta_k, \varphi_k) > r_{j+1,min}(\theta_k, \varphi_k) \qquad \text{[Equation 3]}$$

According to Equation 3, the maximum value in the range of the spatial information points included in the j-th base layer may be set to be larger than the minimum value in the range of the spatial information points included in the j+1-th base layer. Therefore, the spatial information points included in the j-th base layer and the spatial information points included in the j+1-th base layer may be at the least partially duplicated.

As described above, in the case in which at least one duplicate spatial information point is set to be present in the two consecutive base layers, in classifying the spatial information points are for each base layer and representing the layer-projection structure with layer images converted into pixel coordinates, the space between layers caused by translation or rotation of the user may be filled with valid pixels, such that the image in which the hole caused by viewpoint translation or rotation hardly ever occurs may be constructed. Accordingly, it is possible to obtain an effect similar to in-painting in which a hole portion occurring in the process of generating a new intermediate-viewpoint image using a multi-view image is filled with adjacent pixel information or adjacent viewpoint image.

Figure 8:
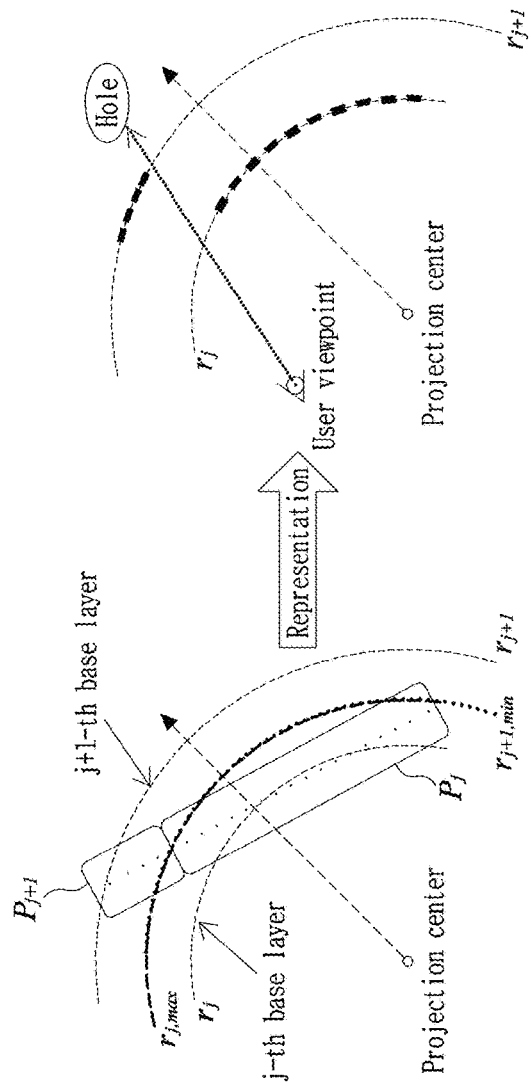
FIGS. 8 and 9 are diagrams illustrating comparison of effects of representing a view image of a user's viewpoint depending on a method of selecting a subset of spatial information points included in each base layer according to the present disclosure.
Figure 9:
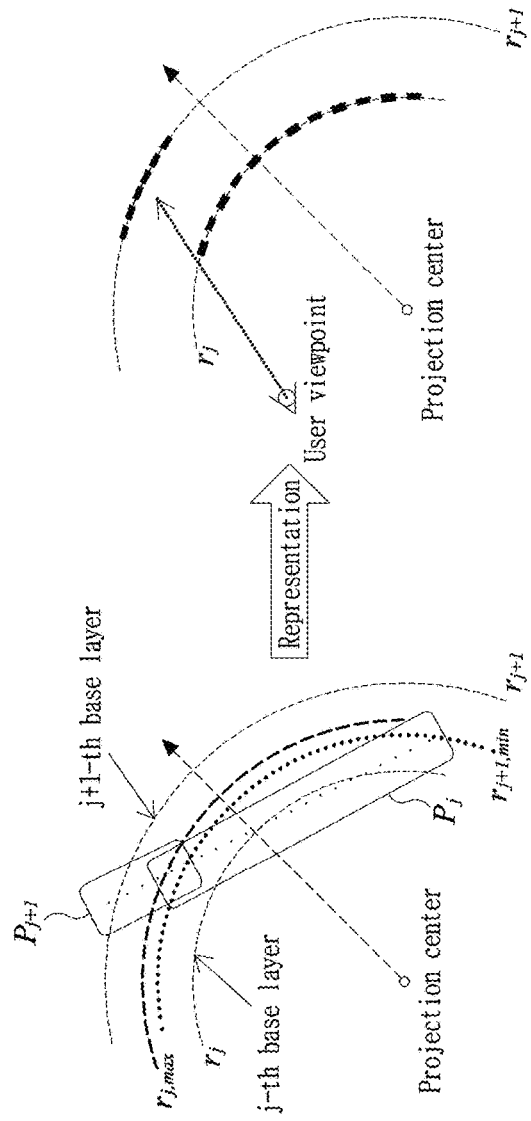

FIGS. 8 and 9 are diagrams illustrating comparison of effects of representing a view image of a user's viewpoint depending on a method of selecting a subset of spatial information points included in each base layer according to the present disclosure. In the examples shown in FIGS. 8 and 9, the X-Z axes cross section is illustrated for convenience of description, but the same example is applied in the entire 360-degree directions.

The example in FIG. 8 shows the case in which there is no duplicate spatial information point in the two consecutive base layers (for example, in the case of $r_{j,max}(\theta_k, \varphi_k) = r_{j+1,min}(\theta_k, \varphi_k)$). That is, it is assumed that there is no element of the intersection of $P_j$ and $P_{j+1}$.

In this case, when representing the stereoscopic image, there is no hole in the view image of the viewpoint from the projection center. However, when the user's viewpoint is translated, the blank portion between the layers appears as a hole.

The example in FIG. 9 shows the case in which a duplicate spatial information point is present in the two consecutive base layers (for example, in the case of $r_{j,max}(\theta_k, \varphi_k) > r_{j+1,min}(\theta_k, \varphi_k)$). That is, it is assumed that the element of the intersection of $P_j$ and $P_{j+1}$ is present.

In this case, in representing the stereoscopic image, even when the user's viewpoint is translated from the projection center, the blank portion between the layers is filled and the hole does not occur.

Referring back to FIG. 7, the subset of the spatial information points mapped to each base layer may be output by the spatial information point layer-projection unit 710. Projection merging units 720_1, ..., and 720_M may construct a single higher layer by merging two or more base layers. Also, when there are multiple higher layers constructed by merging of multiple base layers, these two or more higher layers are merged to construct a single highest layer. As described above, a hierarchical layer structure may be constructed based on the base layers.

Here, some base layers may not be merged with other base layers. That is, layer merge may be applicable selectively depending on a predetermined condition. For example, the predetermined condition may be determined on the basis of whether or not the same profile applies to adjacent layers.

The projection merging units 720_1, ..., and 720_M may calculate the spatial information points included in a single higher layer, which are the union of the spatial information points included in multiple lower layers. The lower layers to be merged may be layers (or base layers) adjacent to the projection center.

For example, the j−1-th base layer, the j-th base layer, and the j+1-th base layer output from the spatial information point layer-projection unit 710 are merged to construct the m-th layer which is a new single higher layer. In this case, the subset $P'_m$ of the spatial information points included in the m-th layer may be expressed as shown in the following Equation 4.

$$P'_m = P_{j-1} \cup P_j \cup P_{j+1} \quad \text{[Equation 4]}$$

In Equation 4, spatial information points included in the intersections (namely, $P_{j-1} \cap P_j$ and $P_j \cap P_{j+1}$) of the spatial information points included in two consecutive base layers may be organized in such a manner that only one is included within the subset of the spatial information points of a new merged layer $P'_m$ (namely, not to include duplicate data). Also, new indices of the spatial information points may be assigned within the subset of the spatial information points of $P'_m$. For example, the subset of the spatial information points of the merged layer may be newly aligned while maintaining the relative order in the subset of the spatial information points of the layer before being merged. For example, indices are sequentially assigned to the spatial information points included in the layer having a low layer index (namely, the layer far from the projection center), and indices may be reassigned to the spatial information points included in the layer corresponding to a subsequent layer index except for duplicate spatial information points.

By the above-described layer merging, application of the profile may be simplified. For example, when an independent profile applies to each base layer, the process of selecting and indexing the subset of the spatial information points may be performed each time according to a layer-projection structure and method different for each profile, which may increase the processing burden. When a new higher layer is constructed by merging multiple base layers, one profile is applicable to a single higher layer such that the processing burden is reduced.

Next, layer image converting units 730_1, 730_2, ..., and 730_N may map the spatial-information-point subsets, which correspond to layers (base layers and/or merged layers) output from the spatial information point layer-projection unit 710 or the projection merging units 720_1, ..., and 720_M, to the valid pixels of the layer image through pixel coordinate conversion of the layer image.

Each of the layer image converting units 730_1, 730_2, ..., and 730_N may perform conversion into the valid pixels according to the index order assigned to the spatial information points within the spatial-information-point subset which is input. For example, indices may be assigned to the spatial information points in order of decreasing distance from the projection center. In the case in which the spatial information points are mapped to the valid pixels in order of increasing index, when multiple spatial information points are mapped to the same pixel coordinates, a pixel value of the spatial information point closest to the projection center is finally mapped to the layer image without a comparison operation process. That is, among the multiple spatial information points mapped to the same pixel coordinates, the spatial information point having the lowest index is converted to the valid pixel of the layer image first, the spatial information point having a sequentially higher index is converted to the valid pixel by replacing the previous valid pixel, and the spatial information point having the highest index is converted to the final valid pixel by replacing the valid pixels based on previous spatial information points. Alternatively, when the lowest index is assigned to a particular position from the projection central point and indices are assigned in order of increasing distance from the particular position, among the multiple spatial information points mapped to the same pixel coordinates, the spatial information point having the highest index is converted to the valid pixel of the layer image first, the spatial information point having a sequentially lower index is converted to the valid pixel by replacing the previous valid pixel, and the spatial information point having the lowest index is converted to the final valid pixel by replacing the valid pixels based on the previous spatial information points.

For example, when the first layer is relatively close to the projection center than the second layer, the first valid pixel of the layer image of the first layer may replace the second valid pixel among valid pixels of the layer image of the second layer, which is mapped to the same pixel coordinates as the first valid pixel. That is, multiple spatial information points may be repeatedly mapped to the same pixel, but pixel information of the spatial information point mapped last will be left.

In the meantime, when the first layer is relatively close to the projection center than the second layer, the transparent pixel of the layer image of the first layer may be replaced by the valid pixel among valid pixels of the layer image of the second layer, which is mapped to the same pixel coordinates as the transparent pixel.

Also, the resolution of the layer image generated by each of the layer image converting units 730_1, 730_2, . . . , and 730_N may be determined approximately by two methods.

According to the first method, the same resolution may be set for all layer images. Accordingly, the area (for example, the size of a single pixel) of the surface of the object on which the pixel of the image is projected may be different in size for each layer. In this case, when viewing superimposed images in which layer projection is performed on each layer image, the image quality of the back layer (namely, the layer far from the projection center) is relatively degraded, compared with the front layer (namely, the layer close to the projection center). Also, as the size of the area represented by a single pixel of the back layer is relatively larger than that of the front layer, an image in which depth perception between layers is distorted may be displayed.

According to the second method, different resolutions may be determined for layer images in such a manner that the area (for example, the size of a single pixel) of the surface of the projection object is fixed in size regardless of layer. Accordingly, the resolution of the layer image may relatively increase in proportion to the size of the projection object. In this case, layer images of different layers (namely, layers positioned at different distances from the projection center) may provide similar image quality.

According to the embodiment of the present disclosure, in order for all layers to provide images of similar quality as possible regardless of translation of the user's viewpoint, different resolutions of layer images according to the second method may apply.

Layer images output from respective layer image converting units 730_1, 730_2, . . . , and 730_N may be encoded by layer-image-video-segment encoding units 740_1, 740_2, . . . , 740_N, respectively. For encoding for each layer image, according to profiles (profile 1, profile 2, . . . , and profile N) applying to respective layer images, metadata (namely, the metadata of the layer image) based on the layer image and the layer-projection structure may be provided. The encoded results may be output in the form of multiple pieces of layer-image-video-segment data 750_1, 750_2, . . . , and 750_N. That is, the layer image encoded according to a first profile (profile 1) may be output as layer-image-video-segment data 750_1, the layer image encoded according to a second profile (profile 2) may be output as layer-image-video-segment data 750_2, and the layer image encoded according to the N-th profile (profile N) may be output as layer-image-video-segment data 750_N.

The layer-image-video-segment data 750_1, 750_2, . . . , and 750_N may be transmitted to a video segment streaming server 760. The video segment streaming server 760 may adaptively generate data suitable for streaming on the basis of the metadata provided from the video-segment-metadata generating unit 755.

For example, the metadata provided from the video-segment-metadata generating unit 755 may further include metadata (namely, metadata of the layer image) applied in encoding of the layer-image-video segment and metadata (namely, metadata required to construct a video segment according to a streaming technique (for example, DASH)) applied to the video segment.

The video segment streaming server 760 may sequentially transmit video segment data to a video segment streaming client 770 over a communication network and/or a broadcasting network by a streaming method.

For example, as the video streaming method, DASH technology based on a broadcasting-communication convergence network may apply.

Also, the video segment streaming client 770 may transmit, to the video segment streaming server 760, request information for the video segments of the profile that is suitable for the network state or is selected by the user. The video segment streaming server 760 may adaptively construct the video segment considering metadata (namely, the metadata of the layer image and the metadata applied to the video segment), profiles, network state, and the like overall, and may transmit the video segments to the client side by the streaming method.

A layer-image-video-segment decoding unit 780 may decode the video segments received from the video segment streaming client 770, and may extract layer images and metadata of the layer-projection structure (namely, the metadata of the layer image and the metadata applied to the video segment). The extracted information may be transmitted to a layer image layer-projection unit 790.

The layer image layer-projection unit 790 may use the layer images corresponding to the profiles and the metadata of the projection structure (namely, the metadata of the layer image) decoded by the layer-image-video-segment decoding unit 780 so as to configure layer projection of the image as shown in the examples of FIGS. 5 and 9. Accordingly, on the basis of translation/rotation state information of the user obtained from the sensor provided on the user side, the view image corresponding to the left and right viewpoints may be output on the display (for example, the HMD).

Also, in the process of constructing each layer image output from the layer-image-video-segment decoding unit 780 by the layer projection method, in order to represent the image with enhanced depth perception, point spread function (PSF) filter setting information for each layer image may be provided to the layer image layer-projection unit 790. Accordingly, the layer image layer-projection unit 790 performs convolution operation of a PSF filter with each layer image to adjust the blurring level of the image, thereby maximizing depth of field (DoF) effect on the view image that the user experiences.

According to the various embodiments of the present disclosure, within the predetermined range in the layered projection structure based on multiple images, the omnidirectional stereoscopic image in which parallax change occurs due to 6DoF rotation and translation of the user may be represented. Also, in the present disclosure, since the actual-object image is used, it is possible to intactly apply conventional encoding/decoding and transmission and reception technology of the 360-degree video such that relevant technology and equipment may be reused. Also, with function expansion of adding the metadata for representation in the layer-projection structure, the embodiments according to the present disclosure are easily applied.

Also, each layer image used in layer projection representation on each layer (namely, each depth) according to the present disclosure is composed of valid pixels including spatial information and transparent pixels to which a transparent color is assigned to view the back layer, and thus the compression ratio of the video increases according to the spatial distribution and the ratio of the transparent pixels.

Therefore, a layer partially including the front part of the scene within an image or an intermediate-layer image including valid pixel information of a partial side has a higher ratio of transparent pixels compared with the layer image corresponding to the background, and thus the size of the entire compressed video does not greatly increase compared with the number of layer images, which results in reduction in the overhead of storage and transmission.

Also, according to the embodiments of the present disclosure, by increasing the number of subdivided layers according to the distance (or depth) or by setting the gap between layers to be fine, the accuracy of representing the actual scene may be enhanced. Surely, the data size may be increased by increasing the number of layers and setting the narrow gap between layers. However, even though the number of video images required for display is increased, the ratio of transparent pixels is high in the image of the subdivided intermediate layer and adjacent-layer images have the great similarity therebetween such that image compression is easy and compression efficiency is high. Consequently, according to the embodiments of the present disclosure, the bit rate of the video stream to be transmitted does not greatly increase and representation quality is enhanced.

Figure 10:
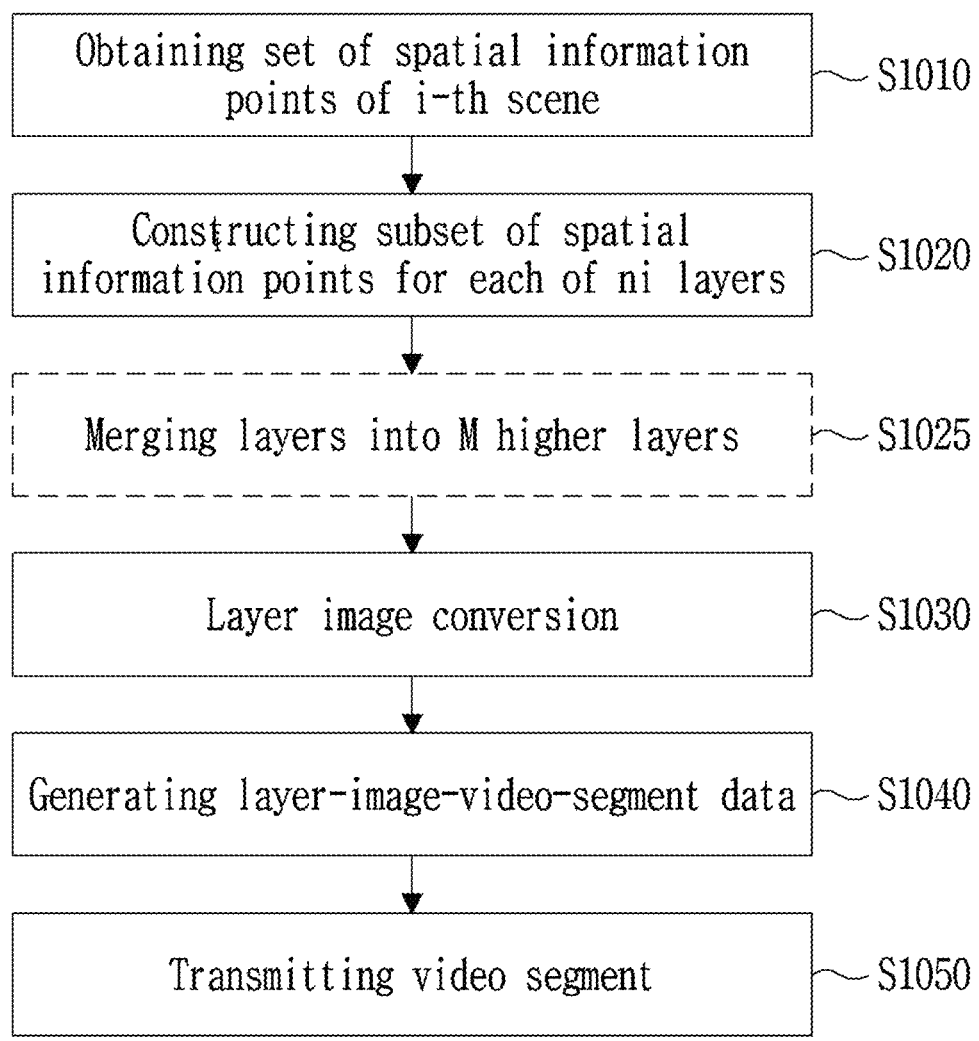
FIG. 10 is a flowchart illustrating an operation of encoding and transmitting an omni-directional stereoscopic image signal based on layer projection according to the present disclosure.

FIG. 10 is a flowchart illustrating an operation of encoding and transmitting an omni-directional stereoscopic image signal based on layer projection according to the present disclosure.

The operation shown in FIG. 10 may be performed by an apparatus on the encoding side.

At step S1010, a spatial-information-point set of the i-th scene may be obtained.

At step S1020, spatial-information-point subsets may be constructed for $n_i$ base layers, respectively. Here, each subset may be constructed in such a manner that at least one duplicate spatial information point is present between two consecutive base layers. Also, the gap between the base layers is set to be fine when being close to the projection center. Also, the maximum value $n_i$ of the number of projection objects (or layers or layer images) and the size $r(n_x)$ (here, $n_x=1, 2, \ldots, n_i-1$, and $n_i$) of the projection object may be determined depending on the value i.

At step S1025, when a predetermined condition is satisfied, $n_i$ base layers are merged into M higher layers. Here, the predetermined conditions may include the case where the profiles of adjacent layers are the same, and the like.

At step S1030, layer image conversion may be performed. For example, conversion into valid pixels may be performed according to the index order assigned to spatial information points included in a single base layer or a merged layer. Also, different resolutions may be determined for layer images in such a manner that the area (for example, the size of a single pixel) of the surface of the projection object is fixed in size regardless of layer.

At step S1040, the layer-image-video-segment data may be generated. The layer-image-video segment may be generated according to the layer image, the metadata of the layer-projection structure (namely, the metadata of the layer image), and the profile for each layer.

At step S1050, the video segments may be transmitted. The video segments may be constructed on the basis of the layer-image-video segments and video-segment metadata (namely, metadata applied to the video segments). Accordingly, the video segments of the i-th scene (or image frame) may be transmitted, and then the video segments of the i+1-th scene (or image frame) may be constructed and transmitted in the same manner as the above-described steps S1010 to S1040. As described above, video segments of consecutive scenes may be transmitted by the streaming method. Alternatively, video segments of consecutive scenes may be pre-generated, and the generated video segment may be transmitted by the streaming method.

Figure 11:
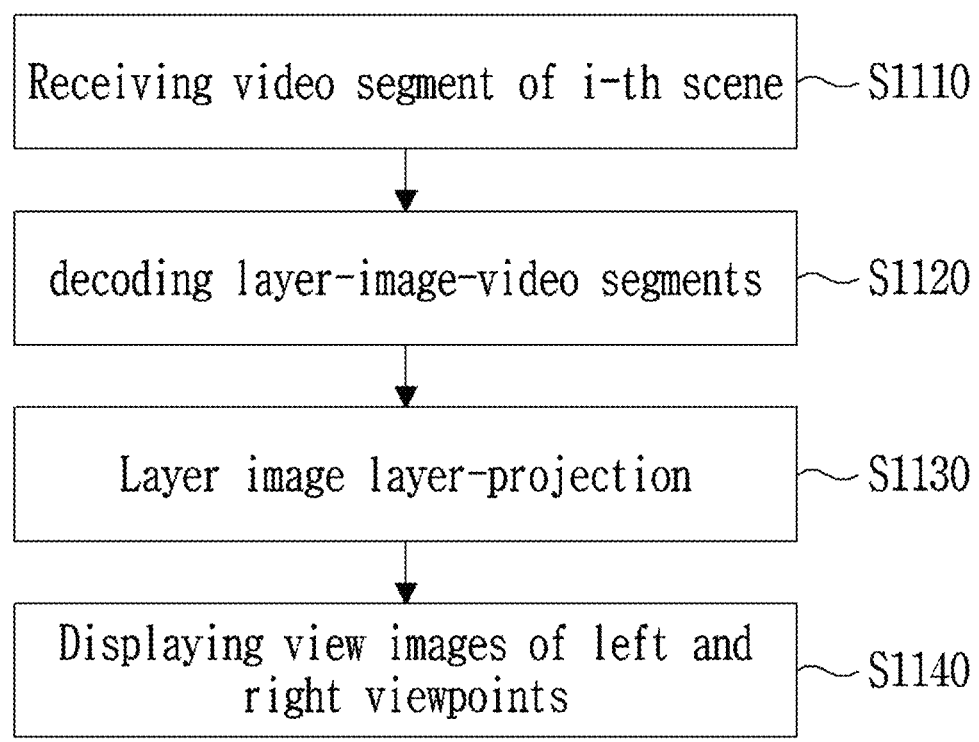
FIG. 11 is a flowchart illustrating an operation of receiving and decoding an omni-directional stereoscopic image signal based on layer projection according to the present disclosure.

FIG. 11 is a flowchart illustrating an operation of receiving and decoding an omni-directional stereoscopic image signal based on layer projection according to the present disclosure.

The operation shown in FIG. 11 may be performed by an apparatus on the decoding side.

At step S1110, the video segments of the i-th scene may be received.

At step S1120, by decoding the layer-image-video segments, layer images corresponding to respective profiles and metadata of the layer-projection structure (namely, the metadata of the layer image and the metadata applied to the video segment) may be extracted.

At step S1130, layer projection may be performed on the layer image. The layer images and the metadata (namely, the metadata of the layer image) may be used to configure layer projection as shown in the examples of FIGS. 5 and 9.

Here, in the layer images corresponding to multiple layers, the subset of valid pixels corresponding to spatial information points configured for each of two consecutive layers may include valid pixels corresponding to one or more duplicate spatial information points. That is, in consecutive first and second layers, a portion of the valid pixels of the layer image related to the first layer duplicately corresponds to a portion of the valid pixels of the layer image related to the second layer with respect to the same spatial information point.

At step S1140, considering translation or rotation state of the user, the view image corresponding to the left and right viewpoints may be constructed and displayed.

Although exemplary methods of the present disclosure are represented as a series of operations for clarity of description, the order of the steps is not limited thereto. When necessary, the illustrated steps may be performed simultaneously or in a different order. In order to realize the method according to the present disclosure, other steps may be added to the illustrative steps, some steps may be excluded from the illustrative steps, or some steps may be excluded while additional steps may be included.

The various embodiments of the present disclosure are not intended to list all possible combinations, but to illustrate representative aspects of the present disclosure. The matters described in the various embodiments may be applied independently or in a combination of two or more.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of providing an omni-directional stereoscopic image based on layer projection, the method comprising:
   obtaining a set of spatial-information-points included in a frame of an input image;
   constructing, for each of multiple layers, a subset of the spatial-information-points from the obtained set by selecting the subset based on a respective position of the spatial-information-points therein; and
   generating a layer image based on the constructed subset, the layer image corresponding to each of the multiple layers,
   wherein a subset constructed for each of two consecutive layers includes one or more duplicate spatial information points between the two consecutive layers,
   wherein a first valid pixel of a layer image of a first layer replaces a second valid pixel among valid pixels of a layer image of a second layer that is farther from a projection center than the first layer, the second valid pixel being mapped to same pixel coordinates as the first valid pixel.

2. The method of claim 1, wherein among the multiple layers, a spatial-information-point subset $P_j$, constructed for a j-th layer includes spatial information points that $$P_j=\{p_k \in P | r_{j,min}(\theta_k,\varphi_k) < \rho_k \leq r_{j,max}(\theta_k,\varphi_k)\},$$

satisfy $\rho_k$ denotes a distance from a projection center to a spatial information point $\rho_k$, $\theta_k$ denotes latitude of the spatial information point $\rho_k$ from the projection center, $\varphi_k$ denotes longitude of the spatial information point $\rho_k$ from the projection center, $r_{j,min}(\theta_k,\varphi_k)$ denotes a minimum value in a range of the spatial information points constructed for the j-th layer, and $r_{j,min}(\theta_k,\varphi_k)$ denotes a maximum value in the range of the spatial information points constructed for the j-th layer.

3. The method of claim 2, wherein the maximum value in the range of the spatial information points constructed for the j-th layer and a minimum value in a range of spatial information points constructed for a j+1-th layer are set to satisfy $r_{j,max}(\theta_k,\varphi_k) > r_{j+1,min}(\theta_k,\varphi_k)$.

4. The method of claim 1, wherein at least one of the multiple layers is a higher layer constructed by merging multiple base layers.

5. The method of claim 1, wherein gaps between the multiple layers are determined depending on respective distances from a projection center.

6. The method of claim 5, wherein the gap between layers close to the projection center is determined to be narrower than the gap between layers far from the projection center.

7. The method of claim 1, wherein a maximum value of a number of the multiple layers and a size of a projection object corresponding to each of the multiple layers vary with time.

8. The method of claim 1, wherein a transparent pixel of the layer image of the first layer is replaced by a valid pixel among the valid pixels of the layer image of the second layer, the valid pixel being mapped to same pixel coordinates as the transparent pixel.

9. The method of claim 1, wherein resolution of the layer image for each layer is set in such a manner that an area of a surface of a projection object is fixed in size regardless of the layer.

10. The method of claim 1, further comprising:
    generating multiple pieces of layer-image-video-segment data based on the layer image corresponding to each of the multiple layers.

11. The method of claim 10, wherein each of the multiple pieces of layer-image-video-segment data is generated based on a profile for each layer and metadata.

12. The method of claim 11, wherein the metadata includes at least one selected from a group of layer-projection structure information depending on a video segment profile, a total number of projection objects required in configuring layer projection, a serial number of each projection object mapped to each layer image, and structure information of each projection object.

13. The method of claim 10, further comprising:
    generating and transmitting a video segment based on a combination of the multiple pieces of layer-image-video-segment data.

14. A method of displaying an omni-directional stereoscopic image display based on layer projection, the method comprising:
    receiving a video segment;
    obtaining a respective layer image corresponding to each of multiple layers and metadata applied to each layer, by decoding layer-image-video segments included in the video segment; and
    performing layer projection on the respective layer image corresponding to each of the multiple layers for a view image of a left viewpoint and a view image of a right viewpoint based on viewpoints determined depending on one or more of translation and rotation of a user,
    wherein in the respective layer image, a subset of valid pixels corresponding to spatial information points included in a subset constructed for each of two consecutive layers includes a valid pixel corresponding to at least one duplicate spatial information point, and
    the constructed subset of the spatial information points is selected based on a respective position of the spatial-information-points therein,
    wherein a first valid pixel of a layer image of a first layer replaces a second valid pixel among valid pixels of a layer image of a second layer that is farther from a projection center than the first layer, the second valid pixel being mapped to same pixel coordinates as the first valid pixel.

15. An apparatus for providing an omni-directional stereoscopic image based on layer projection, the apparatus comprising:
    a spatial information point layer-projection unit configured to construct a spatial-information-point subset for each of multiple layers from a spatial-information-point set that is obtained, by selecting the subset based on a respective position of spatial-information-points included in the set; and
    a layer image converting unit configured to generate a layer image based on the spatial-information-point subset constructed for each of the multiple layers, the layer image corresponding to each of the multiple layers,
    wherein a subset constructed for each of two consecutive layers includes one or more duplicate spatial information points between the two consecutive layers,
    wherein a first valid pixel of a layer image of a first layer replaces a second valid pixel among valid pixels of a layer image of a second layer that is farther from a projection center than the first layer, the second valid pixel being mapped to same pixel coordinates as the first valid pixel.

16. The apparatus of claim 15, further comprising:
a projection merging unit configured to merge multiple base layers to construct a higher layer which is at least one of the multiple layers.

17. The apparatus of claim 15, further comprising:
a layer-image-video-segment encoding unit configured to generate multiple pieces of layer-image-video-segment data based on the layer image corresponding to each of the multiple layers.

18. The apparatus of claim 17, further comprising:
a video segment streaming server configured to transmit a generated video segment based on a combination of the multiple pieces of layer-image-video-segment data.

19. An apparatus for displaying an omni-directional stereoscopic image based on layer projection, the apparatus comprising:
a video segment streaming client configured to receive a video segment;
a layer-image-video-segment decoding unit configured to obtain a respective layer image corresponding to each of multiple layers and metadata applied to each layer, by decoding layer-image-video segments included in the video segment; and
a layer image layer-projection unit configured to perform layer projection on the respective layer image corresponding to each of the multiple layers for a view image of a left viewpoint and a view image of a right viewpoint based on viewpoints determined depending on one or more of translation and rotation of a user,
wherein in the respective layer image, a subset of valid pixels corresponding to spatial information points included in a subset constructed for each of two consecutive layers includes a valid pixel corresponding to at least one duplicate spatial information point, and
the constructed subset of the spatial information points is selected based on a respective position of the spatial-information-points therein,
wherein a first valid pixel of a layer image of a first layer replaces a second valid pixel among valid pixels of a layer image of a second layer that is farther from a projection center than the first layer, the second valid pixel being mapped to same pixel coordinates as the first valid pixel.

* * * * *